US012652322B2

(12) United States Patent
Sarmova

(10) Patent No.: US 12,652,322 B2
(45) Date of Patent: *Jun. 9, 2026

(54) SYSTEMS AND METHODS FOR ESTABLISHING A VIRTUAL SHARED EXPERIENCE FOR MEDIA PLAYBACK

(71) Applicant: Nadejda Sarmova, Long Beach, CA (US)

(72) Inventor: Nadejda Sarmova, Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,816

(22) Filed: Dec. 29, 2022

(65) Prior Publication Data

US 2023/0388354 A1 Nov. 30, 2023

Related U.S. Application Data

(63) Continuation of application No. 17/013,915, filed on Sep. 8, 2020, now Pat. No. 11,582,269, which is a continuation of application No. 15/410,570, filed on Jan. 19, 2017, now Pat. No. 10,771,508.

(60) Provisional application No. 62/280,370, filed on Jan. 19, 2016.

(51) Int. Cl.
| | |
|---|---|
| *H04L 65/1069* | (2022.01) |
| *H04L 65/1093* | (2022.01) |
| *H04N 21/242* | (2011.01) |
| *H04N 21/4788* | (2011.01) |

(52) U.S. Cl.
CPC ...... *H04L 65/1069* (2013.01); *H04L 65/1093* (2013.01); *H04N 21/242* (2013.01); *H04N 21/4788* (2013.01)

(58) Field of Classification Search
None
See application file for complete search history.

(56) References Cited

U.S. PATENT DOCUMENTS

| | | | | |
|---|---|---|---|---|
| 7,426,537 | B2 * | 9/2008 | Lee | G06Q 10/107 |
| | | | | 709/204 |
| 7,934,160 | B2 * | 4/2011 | Bono | G11B 27/034 |
| | | | | 715/756 |
| 8,099,334 | B1 * | 1/2012 | Stockwell | G06Q 30/0601 |
| | | | | 705/26.1 |
| 8,112,490 | B2 * | 2/2012 | Upton | H04L 51/10 |
| | | | | 709/208 |
| 8,190,683 | B2 * | 5/2012 | Sloo | H04N 21/8455 |
| | | | | 709/204 |
| 8,301,691 | B2 * | 10/2012 | Chiba | H04L 41/0273 |
| | | | | 709/204 |
| 8,364,013 | B2 * | 1/2013 | Nijim | G11B 27/105 |
| | | | | 386/239 |
| 8,417,827 | B2 * | 4/2013 | Anttila | H04N 21/6181 |
| | | | | 709/227 |
| 8,418,204 | B2 * | 4/2013 | Pickelsimer | G06F 16/44 |
| | | | | 715/825 |
| 8,433,812 | B2 * | 4/2013 | Mahajan | G06Q 10/10 |
| | | | | 709/229 |

(Continued)

*Primary Examiner* — Ranodhi Serrao

(57) ABSTRACT

Aspects disclosed herein relate to systems and methods for enhanced media consumption. In one aspect, a media platform is provided that allows users to provide commentary while consuming media. The content provided by a user may be saved and associated with a specific portion of the media. The saved commentary may be presented to other users as they consume the same media file.

16 Claims, 5 Drawing Sheets

(56) References Cited

U.S. PATENT DOCUMENTS

| | | | | |
|---|---|---|---|---|
| 8,438,214 | B2 * | 5/2013 | Belimpasakis | H04L 67/1095 709/224 |
| 8,458,128 | B2 * | 6/2013 | Khosravy | G06F 16/2365 707/621 |
| 8,516,375 | B2 * | 8/2013 | Bono | G11B 27/034 715/732 |
| 8,661,353 | B2 * | 2/2014 | Mattingly | G06F 3/048 715/756 |
| 8,719,881 | B2 * | 5/2014 | Riedl | H04N 21/43076 725/86 |
| 8,739,214 | B2 * | 5/2014 | DeLorme | H04N 21/4788 725/100 |
| 8,739,234 | B1 * | 5/2014 | Cheung | H04L 65/00 725/35 |
| 8,745,502 | B2 * | 6/2014 | Snibbe | H04L 67/10 235/383 |
| 8,832,734 | B2 * | 9/2014 | Scott | H04L 65/612 725/105 |
| 2003/0126211 | A1 * | 7/2003 | Anttila | H04N 21/2343 709/205 |
| 2003/0182663 | A1 * | 9/2003 | Gudorf | H04N 21/4788 725/135 |
| 2003/0225834 | A1 * | 12/2003 | Lee | G06Q 10/107 709/204 |
| 2004/0148353 | A1 * | 7/2004 | Karaoguz | H04N 21/222 348/E7.071 |
| 2004/0158850 | A1 * | 8/2004 | Karaoguz | H04N 21/482 348/E7.071 |
| 2004/0205818 | A1 * | 10/2004 | Saruhashi | G09B 7/02 725/78 |
| 2005/0286546 | A1 * | 12/2005 | Bassoli | H04W 88/04 370/503 |
| 2006/0003777 | A1 * | 1/2006 | Nonoyama | G01S 5/0072 455/457 |
| 2006/0235927 | A1 * | 10/2006 | Bhakta | G09B 5/06 709/204 |
| 2007/0271338 | A1 * | 11/2007 | Anschutz | H04L 65/1093 709/204 |
| 2008/0028314 | A1 * | 1/2008 | Bono | G11B 27/034 704/235 |
| 2009/0287790 | A1 * | 11/2009 | Upton | H04N 21/812 709/208 |
| 2010/0306655 | A1 * | 12/2010 | Mattingly | G06F 3/048 715/834 |
| 2010/0306671 | A1 * | 12/2010 | Mattingly | G06F 3/04847 715/834 |
| 2011/0113440 | A1 * | 5/2011 | Roberts | H04N 9/80 725/9 |
| 2011/0119706 | A1 * | 5/2011 | Scott | H04N 21/4668 725/39 |
| 2012/0150997 | A1 * | 6/2012 | McClements, IV | G06Q 10/101 709/217 |
| 2012/0151320 | A1 * | 6/2012 | McClements, IV | G06Q 10/101 715/230 |
| 2012/0151345 | A1 * | 6/2012 | McClements, IV | G06Q 30/0643 715/716 |
| 2012/0284638 | A1 * | 11/2012 | Cutler | G06Q 10/00 715/751 |
| 2013/0014155 | A1 * | 1/2013 | Clarke | G11B 27/105 725/32 |
| 2013/0036168 | A1 * | 2/2013 | Upton | H04L 51/04 709/204 |
| 2013/0103814 | A1 * | 4/2013 | Carrasco | H04L 65/4015 709/231 |
| 2013/0290444 | A1 * | 10/2013 | Billings | H04N 21/44222 709/204 |
| 2014/0039992 | A1 * | 2/2014 | Amidon | G06Q 30/02 705/14.4 |
| 2016/0134690 | A1 * | 5/2016 | Upton | H04L 12/1827 709/204 |

* cited by examiner

SYSTEMS AND METHODS FOR ESTABLISHING A VIRTUAL SHARED EXPERIENCE FOR MEDIA PLAYBACK

CROSS-REFERENCE TO RELATED APPLICATIONS

This application is a continuation of U.S. application Ser. No. 15/410,570, filed Jan. 19, 2017, and titled "Systems and Methods for Establishing a Virtual Shared Experience for Media Playback", which claims priority to U.S. Application No. 62/280,370, filed on Jan. 19, 2016, and titled "Systems and Methods for Establishing a Virtual Shared Experience for Media Playback," the disclosure of which is hereby incorporated by reference in its entirety.

BACKGROUND

Increase in network bandwidth and transmission speeds and the prevalence of mobile devices has given consumers access to content nearly anywhere. Services exist for streaming music, movies, and live events to almost any type of device. As such, the content consumption habits of consumers have changed. Where once consumers were limited to consuming content using radios or televisions, it is now possible to consume the same kind of content on smartphones, tablets, laptops, watches, or any other type of network connectable device with an appropriate interface. This has resulted in a drastic change in media consumption habits.

While it is now possible to consume media almost anywhere, there are drawbacks to the current media consumption habits. Where it used to be common place for groups of people to gather around a television set to watch a movie, consumption of media content is now accomplished using devices that are not suitable for large group consumption. As a result, media consumption has become largely a solitary ritual, resulting in missed opportunities for storytellers and their stories to utilize the full power of the medium to help audiences connect with each other. It is with respect to this general environment that aspects of the present disclosure are contemplated.

SUMMARY

Aspects disclosed herein relate to systems and methods for enhanced media consumption. In one aspect, a media platform is provided that allows users to provide commentary while consuming media. The content provided by a user may be saved and associated with a specific portion of the media. The saved commentary may be presented to other users as they consume the same media file. The provided commentary may be used to enhance the viewing experience of others. For example, the thoughts and feelings of an individual consuming the content may be validated by the comments left by other viewers. As a result, there is a communal aspect to the viewing of content because the individual has access to the thoughts and emotions of others. In doing so, the aspects disclosed herein provide individuals with a social experience of viewing shared content even though the content is being viewed alone. Additionally, comments provided by viewers can result in valuable feedback for the content creators which can be used to further develop their craft.

Additional aspects of the present disclosure provide systems and methods for collectively viewing content from remote locations. In exemplary embodiments, a content server may be provided that is capable of synchronizing the playback content for a number of remote devices. The content server may also establish one or more communication connections between the different remote devices. The communication connections may provide the ability for users of the different devices to interact with one another during the synchronized playback of the media content. The result is a virtual shared experience in which the media content may be consumed by remote users as if the remote users were in the same room.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
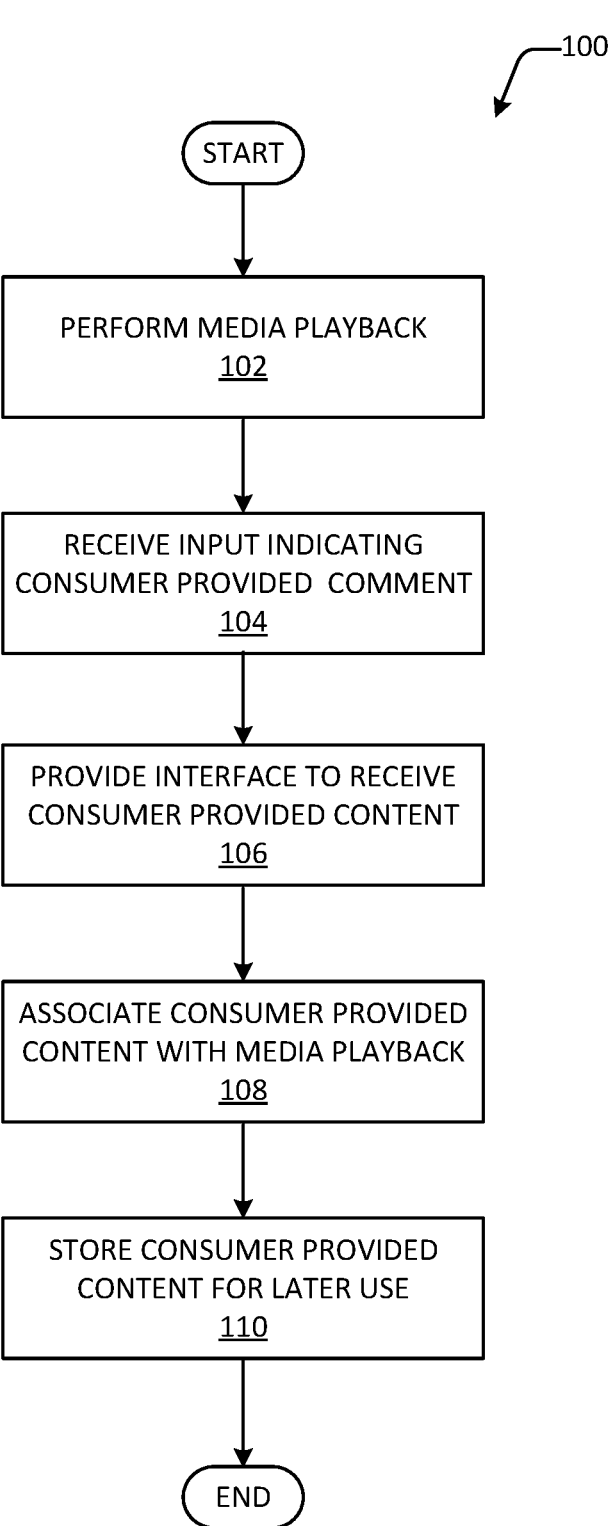
FIG. 1 is an exemplary method for adding consumer provided content to media content during playback.

FIG. 1 is an exemplary method 100 for adding consumer provided content to media content during playback. Consumer provided content may be textual content, video content, audio content, images, etc. The method 100 can be implemented using hardware, software, or a combination of hardware and software. Flow begins at operation 102 where the playback of the media content is initiated. In examples, the media content may be video content, audio content, or other types of multimedia content. Depending on the type of content, a different type of interface may be employed for playback. For example, audio content may be played using a speaker. The speaker may be wired or wirelessly connected to the device performing the method 100. Alternatively, video content may be played using a display that is wired or wirelessly connected to the device performing the method 100. Playback of the content may include providing an interface to control playback of the content. For example, the interface may provide the ability to stop, start, pause, fast forward, and/or rewind the media content. One of skill in the art will appreciate that the control interface provided may vary depending on the type of media content being played. In addition to media playback controls, other interface controls may be provided. For example, controls may be provided that, upon selection, provide for the entry of comments or other types of consumer provided content that may be associated with the media. At some point during media playback, a signal may be received that indicates that a consumer wishes to associate commentary (or other type of content) with the media. For example, one of the interface controls may be activated to provide for the reception of consumer generated content. In response to receiving such a signal, an interface may be provided for receiving the consumer provided content.

Flow continues to operation 104 where the consumer provided content is received. In one example, a text field may be provided that receives text entry of the consumer content. For example, a text field may be displayed that receives a textual content from the user. The textual content may be received via a user interacting with a keyboard, via a speech recognition application, or via other means known to the art. In other examples, a menu may be provided that displays predefined content. The predefined content may be phrases, such as, for example, "This is my favorite part". The predefined content may also be graphical content. For example, a number of emoji's may be displayed. In such embodiments, the predefined content may be selected for association with the media content.

In one aspect, a general comment may be added to the media content. For example, a user may select a general comment and tagging option and a number of predefined comments or tags may be displayed. As noted above, the predefined comments or tags may be system generated words, phrases, images, emoji's, and the like. The predefined comments or tags may be selected from a drop down list, a menu, or any other type of user interface component. Upon selection of the predefined comment or tag, the user may further specify a point in the media content with which the predefined comment or tag should be associated. The point may be identified by time, by a section of content (e.g., a chapter), etc.

In another aspect, a specific comment or tag may be provided. Rather than providing a predefined list of comments or tags, a user interface component may be generated and displayed that allows the user to provide their own content. Example user interface components include a text box, an interface to received audio or video data from the user, or a menu which allows the user to browse for content on their device that to be added to the media content. Upon providing the specific comment or tag, the user may further specify a point in the media content with which the predefined comment or tag should be associated. The point may be identified by time, by a section of content (e.g., a chapter), etc.

Upon receipt of the content, flow continues to operation 106 where the content is associated with the media. In one embodiment, an interface may be displayed that allows for the selection of a specific point at which to associate the consumer provided content with the media. For example, the interface may provide the ability to select a specific time period to associate the content. In other examples, the interface may provide the ability to select different portions of the media to associate the consumer content (e.g., the beginning, the end, a specific chapter, etc.). In still further embodiments, the consumer content may be automatically associated with the media at the time in which the consumer content is received.

Upon associating the consumer provided content with the media, flow continues to operation 108 where the consumer provided content is stored with the media. In one example, storing the consumer provided content with the media may include actually storing the consumer provided content with the video file. In alternate examples, the consumer provided content may not be stored as part of the media file. Instead, the consumer provided content may be stored in a separate data file. In such embodiments, the media content may be modified to include a trigger at the point in which the consumer provided content is to be associated with the video. The trigger may include a pointer to the consumer provided content that is stored in a separate file. In one example, the data stored for a generic comment may include a user name, a user category, a comment identifier that uniquely identifies the consumer provided content, a media identifier that uniquely identifies the media associated with the consumer provided content, a type of the consumer provided content, tags associated with the content, the date the content was created, the date the content was uploaded, etc. Specific comments, that is, comments associated with a specific portion of media, may be stored with information such as a user name, a user category, a comment identifier that uniquely identifies the consumer provided content, a media identifier that uniquely identifies the media associated with the consumer provided content, a type of the consumer provided content, the user provided content start time identifying the point in the tags associated with the user provided content is displayed, a user provided comment end time identifying the point in which the user provided content should no longer be displayed, the date the content was created, the date the content was uploaded, etc.

In examples, storing the consumer provided content may include metadata that defines who can have access to the comments. For example, upon providing content, a user may define who can access the consumer provided content. For example, the consumer provided content may be made available to the user's friends or social acquaintances, to a specific group, or to the entire community. Information related to the consumer provide content access rights may be stored or otherwise associated with the consumer provided comments.

Alternatively, or additionally, the consumer provided content may be relayed to a message bus and transmitted to other users who are watching the same content. The message bus may be equivalent to a queue that carries messages (in this case user provided content) for content that is being viewed be users at various locations. This may allow the consumer provided content to be viewed by other users in real-time.

Figure 2:
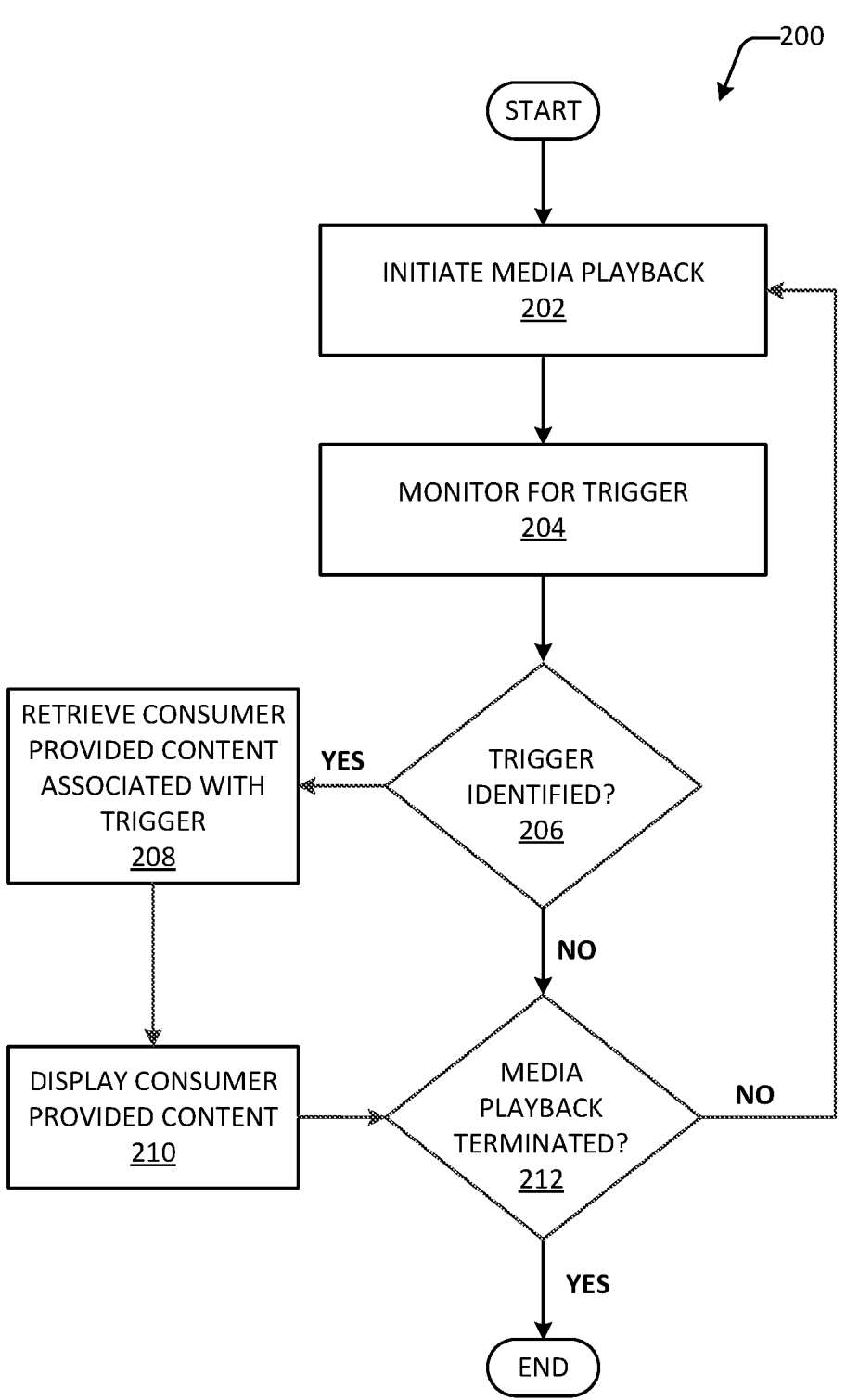
FIG. 2 is an exemplary method for displaying consumer provided content during media playback.

FIG. 2 is an exemplary method 200 for displaying consumer provided content during media playback. Flow begins at operation 202 wherein media playback is initiated. In aspects, the interface for the media playback may vary depending on the type of media. For example, a video playback interface may be initialized to playback videos, an audio interface may be initialized to playback audio content, etc. In certain aspects, regardless of the type of media being played, a graphical interface may be presented. As will be discussed further below, the graphical interface may be utilized to display consumer provided content during playback. Flow continues to operation 204 where the method 200 monitors for a trigger during playback. Monitoring for a trigger may include analyzing a media file to determine whether it includes one or more triggers.

Flow continues to decision operation 206 where a determination is made as to whether a trigger has been identified during playback. In examples, a trigger may be a marker, a placeholder, a reference, or any other type of object that indicates that consumer provided content is available. If a trigger is not reached, flow branches NO to operation 212. At decision operation 212, a determination is made as to whether there is more media content available for playback. If more media content is available, flow branches YES and returns to operation 204 where the method 200 continues to monitor for a trigger. If there is no additional content for playback, flow branches NO and the method 200 terminates.

Returning to decision operation 206, if a trigger is encountered flow branches YES to operation 208. At operation 208, consumer provided content associated with the trigger is retrieved. In one example, the consumer provided content may be retrieved from a datastore. In such embodiments, the identified trigger may include information indicating the location of the trigger. The information can be a pointer to memory or storage space, a file identifier, or any other type of information for identifying the location of content known to the art. Alternatively, the consumer provided content may be stored in the same file as the media content. In such embodiments, the trigger may include information that identifies the location of the consumer provided content within the media file. In still further examples, the consumer provided content may be stored as part of the trigger. Once the content is retrieved, flow continues to operation 210 where the consumer provided content is displayed or otherwise made available. For example, if the multimedia content is a video, the consumer provided content may be displayed in an overlay over the video content. Alternatively, the consumer provided content may be displayed in proximity to the media playback content such that the consumer provided content does not obstruct the video playback. In one example, generic comments and tags may be displayed at the start or end of the media content. The generic comments or tags may be displayed in a comments box that is associated with the media. Alternatively, or additionally, specific comments may be displayed during playback of the media content. In one example, a display of the media content may change to split screen view in which the media content is displayed in one screen and the consumer provided content is displayed in the other screen. During play back, the consumer provided content may be displayed along with information about the user who provided the consumer provided content and/or tags associated with the consumer provided content.

In still further embodiments, the consumer provided content may be transmitted to a different device than the device that is performing the media playback. For example, if a user is playing a video on a television, the consumer provided content may be transmitted to the user's smartphone or laptop for display to the user. In such embodiments, a determination may be made to identify the remote device that should receive the user provided content. For example, the remote device may be determined based upon a user profile. The user profile may include information about devices registered to the user. This information may be used to determine which device to transmit the consumer provided content. In another example, the remote device may be identified based upon its proximity to the device performing the media playback. For example, the consumer provided content may be transmitted to a remote device that is connected to the same network as the device performing the playback.

Once the consumer provided content is played or otherwise made available for consumption, flow continues to decision operation 212. As previously discussed, at decision operation 212 a determination is made as to whether there is more media content available for playback. If more media content is available, flow branches YES and returns to operation 204 where the method 200 continues to monitor for a trigger. If there is no additional content for playback, flow branches NO and the method 200 terminates.

Additional aspects of the present disclosure relate to systems and methods for providing shared playback of content. A content server may be provided that is capable of synchronizing the playback content for a number of remote devices. The content server may also establish one or more communication connections between the different remote devices. The communication connections may provide the ability for users of the different devices to interact with one another during the synchronized playback of the media content. The result is a virtual shared experience in which the media content may be consumed by remote users as if the remote users were in the same room.

Figure 3:
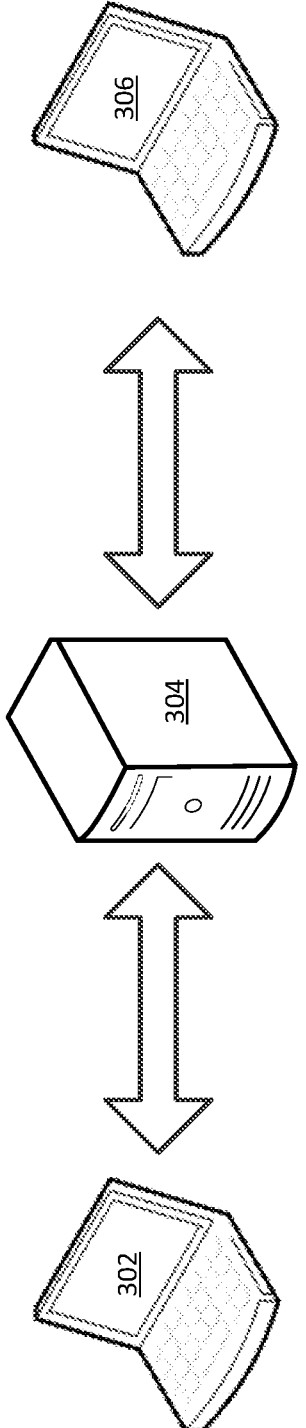
FIG. 3 is an embodiment of a system for providing shared playback.

FIG. 3 is an embodiment of a system 300 for providing shared playback. System 300 includes a first device 302, a content server 304, and a second device 306. Although the system 300 is illustrated as having a set number of components, one of skill in the art will appreciate that the system could have more or fewer components. For example, the system may be capable of providing shared back to a greater number of devices than the two devices 302 and 304 depicted in FIG. 3. In embodiments, the first device 302 may be a television, a computer, a laptop, a tablet, a smartphone, a smartwatch, a media playback system, or any other type of device capable of communicating with other devices via a network and of providing media playback. Similarly, the second device 306 may be a television, a computer, a laptop, a tablet, a smartphone, a media playback system, or any other type of device capable of communicating with other devices via a network and of providing media playback. In one embodiment, the first device 302 and the second device 306 may be the same type of device (e.g., each are tablets). Alternatively, the first device 302 and the second device 306 may be different types of devices (e.g., a smartphone and a television). First device 302 and second device 306 may be connected to the content server 306 via a network. For example, the network may be any type of wired or wireless network, for example, the internet, an intranet, a wide area network (WAN), a local area network (LAN), and a virtual private network (VPN). First device 302 may be connected to content storage server 304 via a first network having a different type than a second network that connects content storage server 304 the second device 306.

In one example, the content storage server may be part of a datacenter that houses all of the media content. In this example, the content storage server 304 may provide links to media content stored in the datacenter as well as comments tied to specific points in the media. For the users to access the data center, the end users must be logged into their account associated with the system 300. The end user may be authenticated using a security certificate and over unsecure network using a combination of secure sockets Layer (SSL) and Transport Security Layer (TLS) for securing connection from the client device to the server. Once the end users are authenticated using the security protocols, the end users associated with a device, such as first device 302 or second device 306, may be able to establish a connection with content storage server 304.

In one example, the first device 302 may send an invitation to the second device 306 for a shared content session. The invitation may be delivered to the second device 306 via the content storage server 304. In one example, the invitation may be generated and sent during playback of media content on a first device 302. In another example, the invitation may be generated and sent prior to playback of media content on the first device 302. In response to receiving the invitation, the second device 306 may send a message indicating acceptance of the invitation to the content storage server 304. Upon receiving the acceptance, the content storage server may identify media content related to the invitation and synchronously providing the identified media content to the first device 302 and the second device 304. In examples, synchronously providing the media content may comprise distributing the media content to the first device 302 and second device 306 such that the media content may be synchronously played by each device. In one example, synchronously providing the media content may comprise simultaneously streaming the media content to the first device 302 and second device 306. Alternatively, the media content may be stored on each of the first device 302 and second device 306. In such embodiments, the content storage server 304 may send instructions to the first device 302 and the second device 304 to simultaneously begin playback of the media content.

In addition to initiating simultaneous playback of the media content on the first device 302 and the second device 306, the content storage server 304 may establish a communications channel between the first device 302 and the second device 304. The communication channel may enable the users of the devices to communicate with each other during playback of the media content. The communications channel may be capable of supporting various different types of communication. In one example, the communications channel may provide the ability to send textual messages between the first device 302 and second device 306 (e.g., instant messaging, email, texting, etc.). Alternatively, the communications channel may provide the ability to transmit audio messages between the first device 302 and the second device 304 (e.g., a voice over IP connection). In still further embodiments, the communications channel may allow for video communication between the first device 302 and second device 306. As such, the system 300 provides the ability for users of the different devices to interact with one another during the synchronized playback of the media content. The result is a virtual shared experience in which the media content may be consumed by remote users as if the remote users were in the same room.

Figure 4:
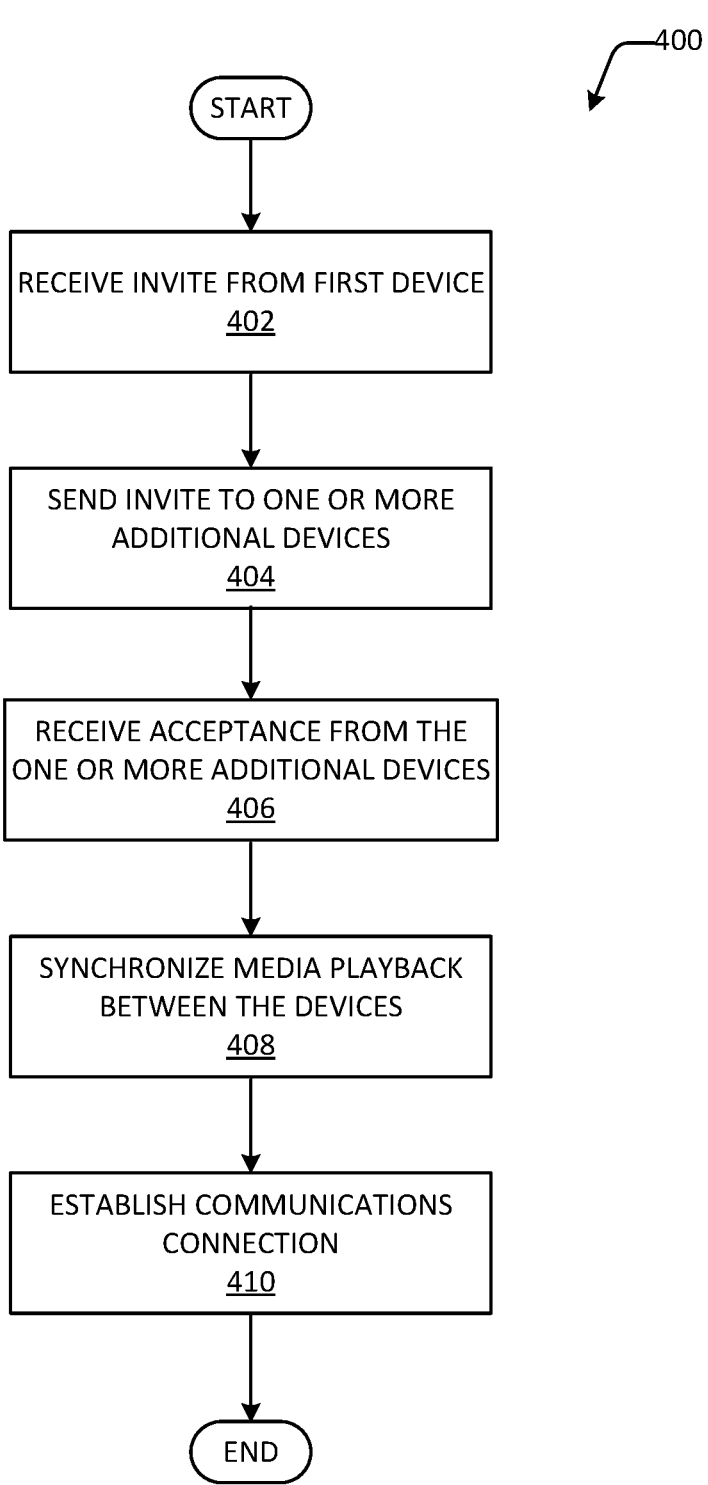
FIG. 4 is an exemplary method 400 for establishing a virtual shared experience for media playback.

FIG. 4 is an exemplary method 400 for establishing a virtual shared experience for media playback. The method 400 can be implemented using hardware, software, or a combination of hardware and software. In embodiments, the method 400 may be performed by a server, such as the media content server 304 of FIG. 3. Flow begins at operation 402, where a message indicating an invitation for a shared virtual experience is received. In embodiments, the message contains information identifying media content for the shared virtual experience, and information about one or more other devices that are invited to the shared experience. The information about the one or more other devices may be based upon a user name or a user profile identified in the request.

Upon receiving the invitation, flow continues to operation 404. At operation 404, the received invitation is sent to the one or more devices identified in the invitation. Flow continues to operation 406 where, in response to sending the invitation to the one or more devices, one or more acceptance messages are received. Flow then continues to operation 408, where the method 400 synchronizes media content playback between the device that sent the invitation and the one or more devices that accepted the invitation. Synchronizing playback may comprise identifying media content related to the invitation and synchronously providing the identified media content to the devices. In examples, synchronously providing the media content may comprise distributing the media content to the devices in a manner such that the media content may be synchronously played by each device. In one example, synchronously providing the media content may comprise simultaneously streaming the media content to the devices. Alternatively, the media content may be stored on each of the devices. In such embodiments, the synchronizing playback may comprise sending instructions to the first device 302 and the second device 304 to simultaneously begin playback of the media content.

Flow continues to operation 410 where a communications channel is established between the device that sent the invitation and the one or more devices that accepted the invitation. As previously discussed, the communications channel may be capable of supporting different types of communications (e.g., text, audio, video, etc.). In one example, the type of communication channel established at operation 410 may depend upon the capabilities of the devices performing in the virtual shared experience. For example, if a device has a microphone, an audio channel may be established. If the device has a camera, a video channel may be established. If the device does not have either of these interfaces, a text channel may be established.

Figure 5:
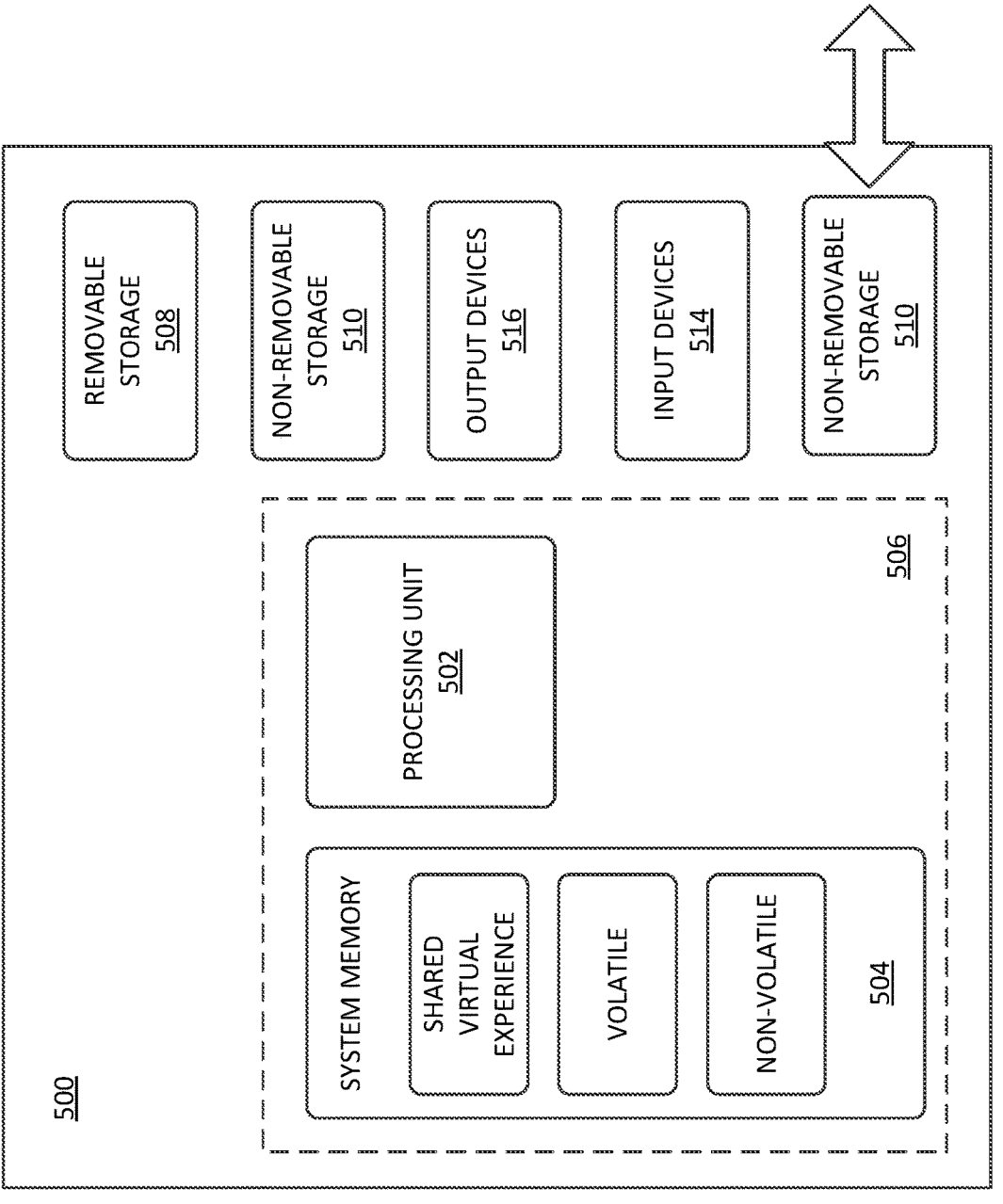
FIG. 5 illustrates one example of a suitable operating environment in which one or more of the present embodiments may be implemented.

FIG. 5 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server, including a server operating in a cloud environment. Generally, program modules include routines, programs, objects, components, data structures and the like that perform particular tasks or implement particular abstract data types. Moreover, it should be appreciated that the disclosure and/or portions thereof may be practiced with other computer system configurations, including handheld devices, multi-processor systems, microprocessor-based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, sequential chains constructed as described herein) may be volatile (such as RAM), non-volatile (such as ROM, flash memory, etc.), or some combination of the two. Memory 504 may store computer instructions related to perform the shared virtual experience methods disclosed herein. Memory 504 may also store computer-executable instructions that may be executed by the processing unit 502 to perform the methods disclosed herein.

This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and nonremovable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Although specific embodiments were described herein and specific examples were provided, the scope of the disclosure is not limited to those specific embodiments and examples. One skilled in the art will recognize other embodiments or improvements that are within the scope and spirit of the present disclosure. Therefore, the specific structure, acts, or media are disclosed only as illustrative embodiments. The scope of the disclosure is defined by the following claims and any equivalents therein.

Additional embodiments are described in the drawings and pages attached to this application.

What is claimed is:

1. A method for establishing a virtual shared connection, the method comprising:

receiving an invitation from a first device;

sending the invitation to a second device, wherein the invitation is associated with media content, the first device is associated with a first user, and the second device is associated with a second user;

in response to sending the invitation, receiving an acceptance;

in response to receiving an acceptance to the invitation, causing synchronous playback of media content at the first device and second device such that the playback is synchronized on the first device and on the second device;

during the synchronous playback on the first device and the second device, detecting a trigger at a point in time during the synchronous playback where user-provided content is associated with the media content, the trigger previously stored in the media content, the trigger identifying user-provided content that was previously received from a third device and that is associated with a third user, the user-provided content being separate from the media content, wherein the trigger identifies a location that the user-provided content is associated with the media content;

based on detecting the trigger, simultaneously causing output of the user-provided content on the first device and the second device;

receiving a communication from the first device; and causing, during synchronous playback, the communication to be output on the second device and not the first device.

2. The method of claim 1, wherein causing, during synchronous playback, the communication to be output on the second device and not the first device comprises causing, during synchronous playback, the communication to be displayed on the second device and not the first device.

3. The method of claim 1, further comprising sending the user-provided content to a fourth device.

4. The method of claim 1, wherein the simultaneously causing of the output of the user-provided content on the first and the second devices comprises simultaneously causing display of the user-provided content on the first and the second devices.

5. The method of claim 1, further comprising: receiving data that associates the user-provided content with the media content; and associating the user provided content with the media content.

6. The method of claim 5, wherein associating the user provided content with the media content comprises modifying the media content to include the trigger.

7. The method of claim 5, wherein: the data comprises a specific time period; and the simultaneously causing of the output of the user-provided content on the first and the second devices is associated with the specific time period.

8. The method of claim 1, wherein the media content comprises:

video content;

text content;

an image;

audio content; or multimedia content.

9. The method of claim 1, wherein the user-provided content comprises:

video content;

text content;

graphic content;

an image; or audio content.

10. A system, comprising:

one or more processors; and a memory operably connected to the one or more processors and storing instructions, that when executed by the one or more processors, cause operations comprising:

sending an invitation received from a first device to a second device, wherein the invitation is associated with media content, the first device is associated with a first user, and the second device is associated with a second user;

in response to receiving an acceptance to the invitation, causing synchronous playback of the media content to the first device and to the second device such that the playback is synchronized on the first device and on the second device;

during the synchronous playback on the first device and the second device, detecting a trigger at a point in time during the synchronous playback where user-provided content is associated with the media content, the trigger previously stored in the media content, the trigger identifying user-provided content that was previously received from a third device and that is associated with a third user, the user-provided content being separate from the media content, wherein the trigger identifies a location that the user-provided content is associated with the media content; and in response to detecting the trigger:

retrieving the previously received user-provided content;

simultaneously causing output of the user-provided content on the first and the second devices;

receiving a communication from the first device; and causing, during synchronous playback, the communication to be output on the second device and not the first device.

11. The system of claim 10, wherein causing, during the synchronous playback, the communication to be output on the second device and not the first device comprises causing, during the synchronous playback, the communication to be displayed on the second device and not the first device.

12. The system of claim 10, wherein the memory stores further instructions for sending the user-provided content to a fourth device.

13. The system of claim 10, wherein the simultaneously causing of the output of the user-provided content on the first and the second devices comprises simultaneously causing display of the user-provided content on the first and the second devices.

14. The system of claim 13, wherein:

the data comprises a specific time period; and the simultaneously causing of the output of the user-provided content on the first and the second devices is associated with the specific time period.

15. The system of claim 10, wherein the memory stores further instructions for: receiving data that associates the user-provided content with the media content; and in response to receiving the data, modifying the media content to include the trigger.

16. A method, comprising:

receiving an invitation from a first device associated with a first user, the invitation associated with media content;

sending the invitation to a second device associated with a second user; in response to sending the invitation, receiving an acceptance;

in response to receiving the acceptance, causing synchronous playback of the media content to the first device and to the second device such that the playback is synchronized on first device and on the second device;

during the synchronous playback on the first device and the second device, identifying a trigger in the media content at a point in time during the synchronous playback where user-provided content is associated with the media content, the trigger identifying user-provided content received from a third computer that is associated with a third user, the user-provided content being separate from the media content, wherein the trigger identifies a location for the user-provided content in the media content;

upon identifying the trigger, simultaneously causing display of the user-provided content on the first and the second devices;

receiving a communication from the first device; and causing, during the synchronous playback, the communication to be output on the second user device and not the first user device.

* * * * *